United States Patent
Haug

(10) Patent No.: US 9,853,331 B2
(45) Date of Patent: Dec. 26, 2017

(54) COVER FOR BATTERIES

(71) Applicants: Robert Bosch GmbH, Stuttgart (DE); Samsung SDI Co., Ltd., Yongin-si, Gyeonggi-do (KR)

(72) Inventor: Karsten Haug, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 550 days.

(21) Appl. No.: 14/331,279

(22) Filed: Jul. 15, 2014

(65) Prior Publication Data

US 2015/0024239 A1    Jan. 22, 2015

(30) Foreign Application Priority Data

Jul. 16, 2013 (DE) .................. 10 2013 213 848

(51) Int. Cl.
| | | |
|---|---|---|
| H01M 10/42 | (2006.01) | |
| H01M 10/48 | (2006.01) | |
| H01M 2/04 | (2006.01) | |
| H01M 2/10 | (2006.01) | |

(52) U.S. Cl.
CPC ..... *H01M 10/4257* (2013.01); *H01M 2/0473* (2013.01); *H01M 2/1077* (2013.01); *H01M 10/482* (2013.01); *H01M 10/486* (2013.01); *H01M 2010/4271* (2013.01)

(58) Field of Classification Search
CPC .................................................. H01M 10/482
See application file for complete search history.

(56) References Cited

U.S. PATENT DOCUMENTS

| | | | | |
|---|---|---|---|---|
| 2003/0008201 | A1* | 1/2003 | Komori | H01M 2/12 429/49 |
| 2008/0193829 | A1* | 8/2008 | Lu | H01M 2/1066 429/100 |
| 2010/0062329 | A1* | 3/2010 | Muis | H01M 2/206 429/158 |
| 2014/0017533 | A1* | 1/2014 | Nishihara | H01M 2/06 429/93 |

FOREIGN PATENT DOCUMENTS

| | | |
|---|---|---|
| DE | 198 10 746 A1 | 9/1999 |
| DE | 10 2008 059 971 A1 | 6/2010 |
| DE | 10 2009 035 469 A1 | 2/2011 |
| DE | 10 2010 022 689 A1 | 12/2011 |
| JP | WO 2012131809 A1 * 10/2012 | .............. H01M 2/06 |
| WO | 2013/083213 A1 | 6/2013 |

* cited by examiner

*Primary Examiner* — Stephan Essex
(74) *Attorney, Agent, or Firm* — Maginot, Moore & Beck LLP

(57) ABSTRACT

A battery module comprises a plurality of electrically interconnected battery cells, a module cover, and a battery cell monitoring unit. The battery cells include at least one terminal cover. The battery cell monitoring unit is positioned on an inner face of the at least one terminal cover.

11 Claims, 4 Drawing Sheets

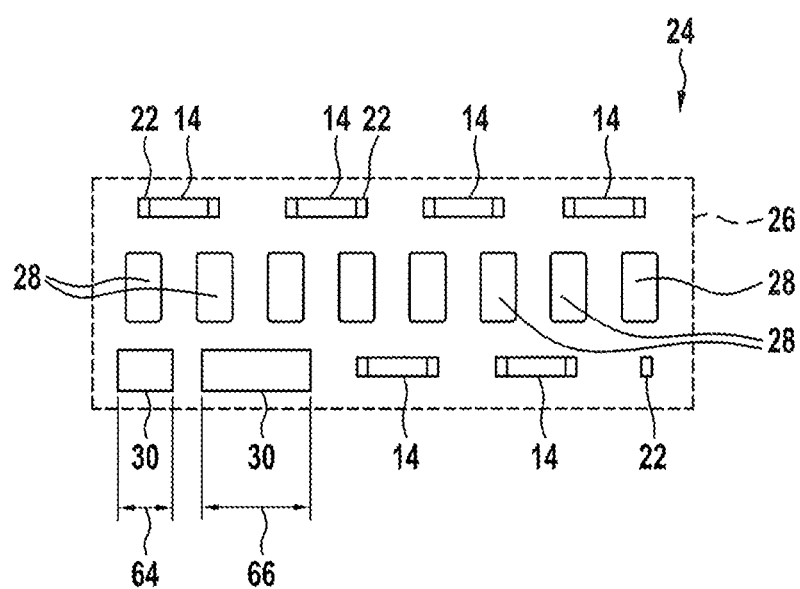

COVER FOR BATTERIES

This application claims priority under 35 U.S.C. §119 to patent application no. 10 2013 213 848.2, filed on Jul. 16, 2013 in Germany, the disclosure of which is incorporated herein by reference in its entirety.

BACKGROUND

DE 10 2010 022 689 A1 relates to a rewiring element for an energy storage module, to a method for producing said rewiring element, and also to an energy storage module. The energy storage module comprises a plurality of storage cells which are arranged one above the other in at least one vertical row. Said storage cells are electrically interconnected to one another in pairs by means of cell connections. The rewiring element comprises a conductor track structure having a plurality of conductor tracks which are arranged next to one another and which extend in the vertical direction, and also a plurality of voltage taps of which the first ends, which face the conductor tracks, are each connected to an associated first end of a respective conductor track. The free second ends of the voltage taps are provided for cohesive connection to associated cell connectors. The voltage taps for compensating for a relative movement of the rewiring element in relation to the cell connectors and/or different extents of the rewiring element and of the cell connectors are designed as movement compensation elements.

Battery cells are typically connected to one another by means of individual lugs which are produced from copper (Cu) or aluminum (Al). In this case, electrical contact is made with terminals of adjacent battery cells by means of connecting lugs, wherein the ends of the connecting lugs are either screwed to the cell terminal or are connected to said cell terminal in a cohesive manner, for example welded to one another. Each battery generally has an associated monitoring circuit (CSC, Cell Supervision Circuit). The cell temperatures and the cell voltages are detected and forwarded to a battery control unit by means of a monitoring circuit of this kind.

The battery cell monitoring circuit is generally located on the battery housing or on the top face of said battery housing. Further embodiments in which the cell monitoring unit, like the cell monitoring circuit, is accommodated in a separate housing, which is connected to the battery module or to another part of a battery pack by means of bolts, are available.

The measuring lines for detecting the cell voltage and the cell temperature, which measuring lines extend between the cell monitoring circuit and the connections, are generally realized by embodiments:

In one embodiment, it is possible to form the signal lines as wires which are, for example, welded to the battery cell connections. Furthermore, in another embodiment, it is possible to use a flexible film, wherein the contact-making point of the flexible film is welded to the cell terminal or is welded to another connection. Furthermore, in yet another embodiment, it is possible to use a punched grid which is welded directly to a battery cell connection.

Embodiments of signal lines outlined above are associated with additional components, for example wires, a flexible film or a punched grid, being required, the use of said additional components necessarily being associated with additional costs. Furthermore, the cohesive joining process constitutes a cost factor. In general, the signal lines are used to detect the battery cell voltage and the battery cell temperature during the assembly process, and therefore there is a risk of said signal lines being damaged in subsequent assembly steps. If the cell monitoring circuit is accommodated in a separate housing, this separate housing, which is connected to the battery cell housing by means of a joining process for example, is included and therefore constitutes additional expenditure. Furthermore, accommodating the cell monitoring circuit on the cover of the battery cell is hazardous. Degassing of the battery cell may occur for example.

All in all, the previous solutions for connecting or accommodating a cell monitoring circuit (CSC, Cell Supervision Circuit) which monitors specific battery cells constitute unsatisfactory solutions, and therefore a corrective measure is offered.

SUMMARY

In view of the technical problem described above, the object of the present disclosure is to form a battery cell monitoring electronics system in a cost-effective manner and to accommodate said battery cell monitoring electronics system on the housing, or on the cover of a housing of a battery cell, in a space-saving manner as far as possible without using additional components and joining processes.

The disclosure proposes a battery module having a number of battery cells which are electrically interconnected with one another, wherein the battery module is provided with a module cover, and the battery cells comprise at least one terminal cover, and a battery cell monitoring unit is fitted to the inner face of the at least one terminal cover.

The battery cell monitoring unit advantageously comprises a printed circuit board (PCB) on which electronic components are held. In addition to the printed circuit board with electronic components, the battery cell monitoring unit, also called CSC (Cell Supervision Circuit), can comprise a temperature sensor which can detect the temperature in the interior of the battery module or else within individual battery cells.

The battery cell monitoring unit is preferably arranged in an installation space which is located on the inner face of the at least one terminal cover. In this case, the battery cell monitoring unit (CSC) is detachably mounted on the inner face of the at least one terminal cover, that is to say facing the housing interior of the battery cell, for example preferably clipped onto the inner face of the at least one terminal cover. To this end, the at least one terminal cover comprises, on its inner face in the region of the installation space, at least one latching means which is designed, in particular, as an encircling latching means in groove form. Since the at least one terminal cover is produced from a plastic material with electrically insulating properties, said terminal cover has a certain degree of elasticity, and therefore the printed circuit board of the battery cell monitoring unit can be easily clipped into the at least one terminal cover.

The printed circuit board of the battery cell monitoring unit (CSC) is preferably provided such that it comprises at least one spring contact, in particular an electrical contact of spring-action design. Said electrical contact is formed on a flat side of the printed circuit board, and arranged such that it faces the inner face of the housing of the battery cell or of the battery module. Electrical contact can be made with a cell connector, which connects two connection terminals of adjacent battery cells to one another, by means of the at least one spring contact which is arranged on that flat side of the printed circuit board which faces the housing. As an alternative, the at least one spring contact can be arranged on that side of the printed circuit board which faces the housing of the battery cell or of the battery module in such a way that the at least one spring contact can make direct electrical contact with one or more connection terminals of battery cells. In this case, electrical contact is made when the terminal cover which is provided with the integrated battery cell monitoring unit is, for its part, pressed or clipped into a module cover of a battery module. When the at least one terminal cover is installed in the module cover, the electrical connection between the battery cell monitoring unit, which is integrated into the at least one terminal cover, and the cell connector or the connection terminal of a respective battery cell, with which electrical contact is to be made and which is to be monitored, is established on account of the spring contact which engages with a spring action on a cell connector or the connection terminal.

The at least one terminal cover is, for its part, detachably mounted in the module cover of the battery module and, analogously to the battery cell monitoring unit or the printed circuit board of said battery cell monitoring unit, clipped into the module cover. The material from which the at least one terminal cover is produced is preferably a plastic material with electrically insulating properties. In this case, the at least one terminal cover is formed such that it comprises a tapered material portion. The tapered material portion constitutes a kind of bending line along which the at least one terminal cover can be deformed, and therefore simple mounting and removal of said terminal cover is considerably simplified by deliberate deformation.

The advantages associated with the solution proposed according to the disclosure can firstly be seen in a drastic reduction in costs since contact is made between the individual battery cells of a battery module of the battery cell monitoring unit when the at least one terminal cover is mounted directly by the mounting process, and as a result wiring, a flexible film and a punched grid and further components are unnecessary. This results in a considerably simpler way of mounting which is reliable over the long term, wherein it is also possible, in a simple manner, to assign a temperature sensor to the printed circuit board or to the printed circuit of the battery cell monitoring unit which is preferably clipped into the at least one terminal cover.

The formation of cohesive connections, for example welded seams, which likewise constitute costly working steps, can also be avoided by virtue of the solution proposed according to the disclosure. Furthermore, owing to the integration of the battery cell monitoring unit into the at least one terminal cover, a separate housing for holding the battery cell monitoring unit has become superfluous. The same applies for mechanically connecting elements with which the separate external housing for holding the battery monitoring units have been connected to the housings of the battery modules or of the individual battery cells up to now.

Owing to the solution proposed according to the disclosure, it is possible, in a simple way, for electrical contact to be directly established between cell connectors and the battery monitoring unit by the at least one spring contact when the terminal covers are fitted. Manufacturing tolerances can likewise be compensated for by the spring-action design of the spring contacts. When the terminal covers are opened, that is to say when the latching means are released and the terminal covers are removed, the electrical connection between the battery cell monitoring unit and the cell connectors, or the connection terminals of the battery cells, is automatically interrupted. Since the printed circuit board or a printed circuit of the battery cell monitoring unit is surrounded by a border on which latching means or latching recesses are held, said printed circuit board or printed circuit is accommodated in a protective manner, and therefore damage to the electronic components and/or to a temperature sensor which is held on the printed circuit board is also virtually precluded during mounting.

BRIEF DESCRIPTION OF THE DRAWINGS

In the drawings:
FIG. 7 shows another embodiment of a battery module with shortened multipartite terminal covers.

DETAILED DESCRIPTION

Figure 1:
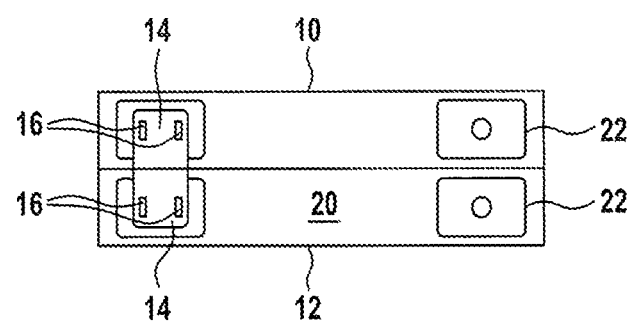
FIG. 1 shows a plan view of two battery cells.
Figure 2:
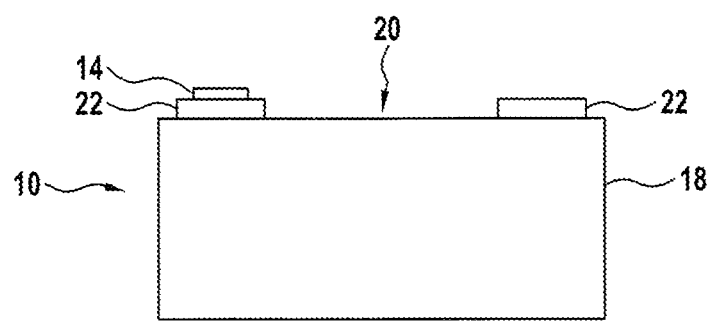
FIG. 2 shows a side view of a battery cell.

The illustration in FIG. 1 shows the plan view of two battery cells 10, 12 which are in electrical contact with one another. The two battery cells 10, 12 bear against one another and make electrical contact with one another by means of a cell connector 14 which is in the form of a connecting lug which is composed of copper (Cu), aluminum (Al) or a copper/aluminum alloy. An electrical insulation between the two cell housings of the battery cells 10, 12 is not depicted. The individual cell connectors 14 are connected to one another at weld seams 16 by way of connection terminals 22 of the two battery cells 10, 12. This can also be seen in the side view of the battery cell 10 according to FIG. 2. The cell connectors 14 are preferably provided as connecting lugs which are composed of copper, aluminum or a copper/aluminum alloy.

Figure 3:
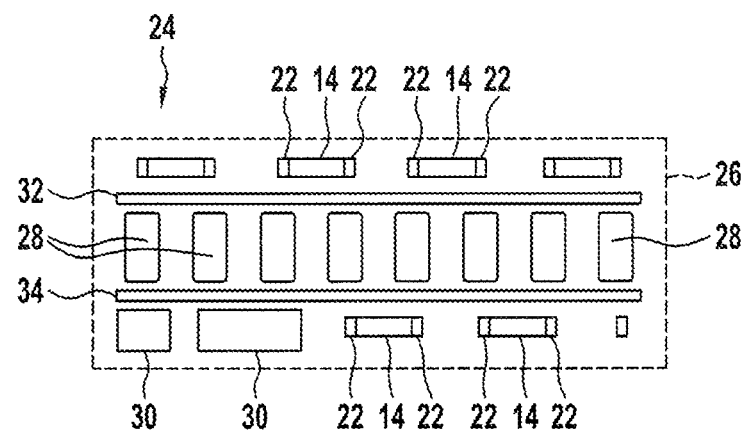
FIG. 3 shows a plan view of a battery module having a plurality of battery cells.

The plan view according to FIG. 3 shows a battery module 24 which comprises a number of battery cells 10, 12, not illustrated in any detail. The individual battery cells 10, 12 are electrically connected to one another by means of the cell connectors 14, wherein the cell connector 14 extends between in each case two connection terminals 22 of two battery cells 10, 12 with which electrical contact is to be made. The battery module 24 comprises a module cover 26 which has a cutout 28 for degassing purposes above each of the battery cells 10, 12 which are held within the battery module 24. The battery module 24 is closed by means of the module cover 26. The module cover 26 further has terminal covers 30 which extend above the connection terminals 22 or over cell connectors 14. As shown in the illustration according to FIG. 3, connecting lines 32, 34 extend through the interior of the battery module 24, said connecting lines up until now establishing a connection between the individual battery cells 10, 12 which are accommodated in the battery module 24 and the battery cell monitoring unit, not designated in any more detail in FIG. 3.

Figure 4:
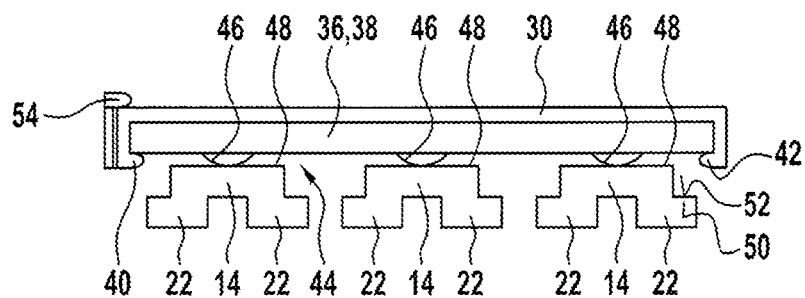
FIG. 4 shows a side view of a battery cell monitoring unit, which is illustrated by way of example, with spring contacts integrated in a terminal cover.

The illustration according to FIG. 4 shows a first side view of a battery battery cell monitoring unit 36 which is integrated on the bottom face of a terminal cover 30.

The illustration according to FIG. 4 shows that an installation space 44 is formed in the terminal cover 30 on the inner face 58 of said terminal cover. A battery cell monitoring unit 36 which is of substantially flat design is clipped into said installation space 44, it being possible for said battery cell monitoring unit to comprise, for example, a printed circuit or printed circuit board 38 (PCB). As shown in the side view according to FIG. 4, the printed circuit 38 of the battery cell monitoring unit 36 is fixed to lug-like projections by means of, for example, encircling latching means 42 and 40. On account of the latching means 40 and 42 extending in an encircling manner, the battery cell monitoring unit 36 is protected against mechanical damage and is securely mechanically fixed on all sides. In this case, the battery cell monitoring unit 36 or the printed circuit 38 also comprises, in addition to electronic components which are not illustrated in any more detail here, a temperature sensor by means of which the temperature in individual battery cells 10, 12 or in the interior of the battery module 24 can be detected.

As shown in the illustration according to FIG. 4, the at least one terminal cover 30 is, for its part, detachably mounted in a module cover 26, which is not illustrated in FIG. 4 but is illustrated in FIG. 3, of the battery module 24 by means of a latching means 54. In the mounted state of the at least one terminal cover 30, spring contacts 46 which are formed on the bottom face of the battery cell monitoring unit 36 make contact with the cell connectors 14. The individual connection terminals 22 of the battery cells 10, 12 which are to be electrically interconnected with one another are electrically connected to one another by means of the cell connectors 14 which can be in the form of, for example, aluminum, copper or aluminum/copper alloy lugs. If the at least one terminal cover 30 is installed in the module cover 26 of the battery module 24, direct electrical contact is made by engagement of the spring contacts 46 between the cell connectors 14 and the battery cell monitoring unit 36 and, in particular, the printed circuit board or printed circuit 38 (PCB) of said battery cell monitoring unit. The spring contacts 46 have a certain degree of elasticity, and therefore firstly tolerances can be compensated in the installed state and electrical contact can be established between the cell connectors 14 and the two connection terminals 22 by the electronic components which are held on the printed circuit 38 (PCB). However, it is also possible to make direct contact—without the interposition of cell connectors 14—with connection terminals 22 of battery cells 10, 12 directly by means of the spring contacts 46 which are formed on the bottom face of the printed circuit 38 of the battery cell monitoring unit 36.

Figure 5:
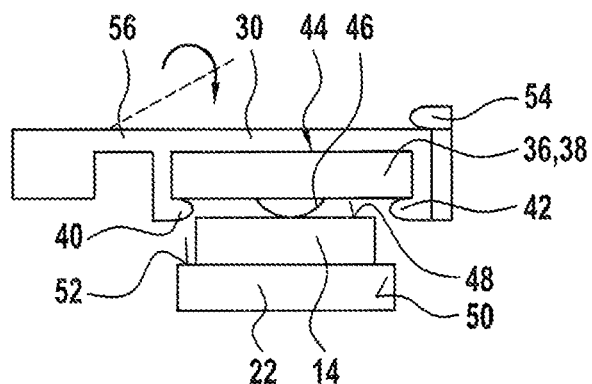
FIG. 5 shows a further side view of a printed circuit board, which is integrated in a terminal cover, of a battery cell monitoring unit.

The illustration according to FIG. 5 shows a further side view of a battery cell monitoring unit 36 which is integrated on the bottom face of a terminal cover 30.

The illustration according to FIG. 5 also shows that the printed circuit 38 of the battery cell monitoring unit 36 is enclosed on all sides by the material of the terminal cover 30, that is to say is protected against mechanical damage. The side view according to FIG. 5 further shows how electrical contact is made with a top face 48 of the cell connector 14, which is designed in the form of a lug, by the at least one spring contact 46 on the bottom face of the printed circuit 38 (PCB). The cell connector 14 for its part makes contact with a top face 52 of the connection terminal 22. FIG. 5 furthermore shows that the terminal cover 30 is mounted on the module cover 26, not illustrated in any more detail in FIG. 5, of the battery module 24 by means of the latching means 54.

The terminal cover 30 is preferably injection-molded from a plastic material which has electrically insulating properties. As a result, the terminal cover 30 can be directly provided with the latching means 40, 42—formed as latching lugs in this case. It is possible to configure the latching means 40, 42 in an encircling manner, so that said latching means completely surround the printed circuit 38 of the battery cell monitoring unit 36.

In addition, it is also possible to form the latching lugs 40, 42 as individual discrete latching lugs and to clip the printed circuit 38 of the battery cell monitoring unit 36 into said latching lugs. The terminal cover 30 can, for its part, likewise be clipped into the cover 26, not illustrated in any more detail in FIG. 5, of the battery module 24 by way of the latching means 54. In the case of the terminal cover 30 which is produced during the course of the plastic extrusion-coating method or plastic injection-molding method, it is possible to form a tapered material portion 56. Owing to the tapered material portion 56, a deliberate weakened material portion is produced in the area of the terminal cover 30. A bending line 60 which is indicated in the plan view according to FIG. 6 runs along this weakened material portion 56.

Figure 6:
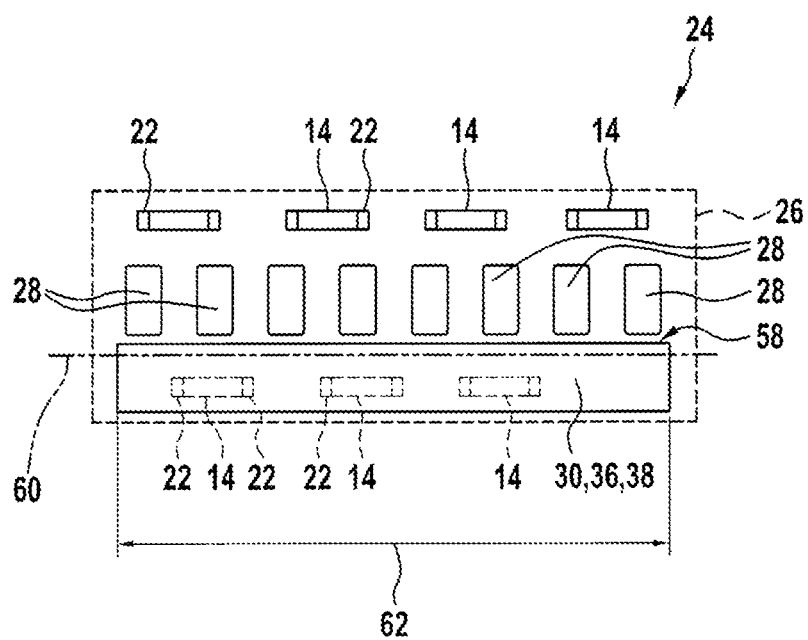
FIG. 6 shows a plan view of a battery module having a terminal cover in an embodiment.

The illustration according to FIG. 6 shows a plan view of one embodiment of the battery module 24 which is proposed according to the disclosure.

As shown in FIG. 6, the terminal cover 30 is of continuous design, that is to say is designed in a long structural form 62, in this embodiment. This means that electrical contact is made with a number of cell connectors 14 or a number of connection terminals 22 of battery cells 10, 12, which are to be electrically interconnected to one another, by one and the same component, that is to say the terminal cover 30 which extends in a continuous manner. The battery cell monitoring unit (CSC) 36 which is illustrated in the side views according to FIGS. 4 and 5 and which is clipped onto the inner face 58, not illustrated in FIG. 6, of the terminal cover 30 in its long structural form 62 in the form of a printed circuit 38 is located on the bottom face of the terminal cover 30 which is illustrated from the outside in the plan view in FIG. 6. Analogously to the illustration according to FIG. 3, the battery module 24 which is illustrated in plan view in FIG. 6 shows a number of cutouts 28 which are required in the cover 26 of the battery module 24 for degassing purposes for the individual battery cells 10, 12 which are electrically connected to one another. The individual connection terminals 22 of the battery cells 10, 12 which are to be electrically connected to one another are electrically connected to one another by the cell connectors 14, already mentioned several times, which are composed of aluminum material or copper material or an aluminum/copper alloy.

As an alternative to the embodiment shown in FIG. 6, FIG. 7 shows terminal covers 30 which are designed in shortened structural forms.

In contrast to the terminal cover 30 which extends in a continuous manner and has a long structural form 62 according to FIG. 6, the cell connectors 14 between the individual connection terminals 22 or the connection terminals 22 of the individual battery cells 10, 12, not illustrated in any more detail in FIG. 7, can be covered directly by terminal covers 30 which have a first short structural form 64 or a second short structural form 66. Two embodiments of the terminal covers 30 according to the illustration in FIG. 7 share the common feature that battery cell monitoring units 36 or printed circuits 38 of said battery cell monitoring units together with a temperature sensor 68 are located on the inner face of said terminal covers, that is to say not visible in FIG. 7—but shown in FIGS. 4 and 5. When the terminal covers 30 are mounted, spring contacts 46, compare the illustration according to FIGS. 4 and 5, can make direct electrical contact with either the cell connectors 14, designed in the form of lugs, or the connection terminals 22 of battery cells 10, 12. The electrical contact between the battery cell monitoring units 36 and the cell connectors 14 or the connection terminals 22 are immediately interrupted when the terminal covers 30 are removed, be they designed in the long structural form 62 or in one of the short structural forms 64, 66. Electrical signal connections between individual terminal covers 30 are not depicted. These are required since it is not possible to carry signals across a continuous printed circuit 38.

For the sake of completeness, it is noted that the terminal cover 30, in particular the terminal cover 30, illustrated in FIG. 6, which extends continuously along the cover 26 of the battery module 24, comprises a bending line 60 on account of the design of the tapered material portion 56, compare illustration according to FIG. 5. Advantageously the plastic component, terminal cover 30, can be deliberately deformed along said bending line 60, without said component being damaged, for mounting and removal purposes. The tapered material portion 56 acts in the manner of a film hinge to a certain extent and allows deliberate deformation of the terminal cover 30, in particular in one embodiment with a long structural form 62 according to the plan view in FIG. 6.

What is claimed is:

1. A battery module, comprising:
   a module body;
   a plurality of battery cells that are positioned in the module body and that each include at least one connection terminal;
   at least one cell connector that electrically interconnects the plurality of battery cells via the at least one connection terminal of each battery cell; and
   a module cover configured to cover the module body in a closed position, and that includes:
      at least one terminal cover detachably mounted in the module cover such that, in the closed position of the module cover, the at least one terminal cover covers the at least one cell connector; and
      a battery cell monitoring unit detachably mounted in an installation space on an inner face of the at least one terminal cover such that, in the closed position of the module cover, the battery cell monitoring unit contacts at least one of the at least one cell connector and the at least one connection terminal.

2. The battery module according to claim 1, wherein the battery cell monitoring unit is clipped into the installation space.

3. The battery module according to claim 2, wherein:
   the at least one terminal cover has at least one latching element in a region of the installation space that is configured to mechanically fix the battery cell monitoring unit to the at least one terminal cover; and
   the at least one terminal cover having an elasticity that enables the battery cell monitoring unit to clip into and out from the at least one latching element.

4. The battery module according to claim 1, wherein the battery cell monitoring unit includes at least one spring contact.

5. The battery module according to claim 1, further comprising a temperature sensor positioned on the inner face of the at least one terminal cover.

6. The battery module according to claim 4, wherein:
   the battery cell monitoring unit includes a printed circuit board; and
   the at least one spring contact is positioned on a side of the printed circuit board facing at least one of the at least one cell connector and the at least one connection terminal.

7. The battery module according to claim 1, wherein the at least one terminal cover is formed from an electrically insulating material.

8. The battery module according to claim 1, wherein:
   the at least one terminal cover includes a tapered material portion; and
   the tapered material portion defines a bending line that runs along the tapered material portion and that enables releasing the battery cell monitoring unit from the at least one terminal cover via bending the at least one terminal cover along the bending line.

9. The battery module according to claim 3, wherein the at least one latching element is at least one encircling latching element.

10. The battery module according to claim 1, wherein the at least one terminal cover is detachably mounted in the module cover of the battery module by being clipped in the module cover of the battery module.

11. A battery module, comprising:
    a module body;
    a plurality of battery cells that are positioned in the module body and that each include at least one connection terminal;
    at least one cell connector that electrically interconnects the plurality of battery cells via the at least one connection terminal of each battery cell; and
    a module cover configured to cover the module body in a closed position, and that includes:
       at least one terminal cover detachably mounted in the module cover such that, in the closed position of the module cover, the at least one terminal cover covers the at least one cell connector, wherein the at least one terminal cover includes a tapered material portion that defines a bending line running along the tapered material portion; and
       a battery cell monitoring unit positioned on an inner face of the at least one terminal cover such that, in the closed position of the module cover, the battery cell monitoring unit contacts at least one of the at least one cell connector and the at least one connection terminal, wherein the tapered material portion of the at least one terminal cover enables releasing the battery cell monitoring unit from the at least one terminal cover via bending the at least one terminal cover along the bending line.

* * * * *